Fig.1

Aug. 17, 1965  A. ANSAR ETAL  3,201,131
RECORD-CHANGING GRAMOPHONES
Filed Sept. 18, 1962  7 Sheets-Sheet 3

Aug. 17, 1965    A. ANSAR ETAL    3,201,131
RECORD-CHANGING GRAMOPHONES
Filed Sept. 18, 1962    7 Sheets-Sheet 4

3,201,131
RECORD-CHANGING GRAMOPHONES
Anders Ansar, Nykoping, Sweden, and Edward William John Caddy, Swindon, England, assignors to The Garrard Engineering & Manufacturing Company Limited, Swindon, England
Filed Sept. 18, 1962, Ser. No. 224,395
Claims priority, application Great Britain, Sept. 20, 1961, 33,697/61
13 Claims. (Cl. 274—10)

This invention relates to record-changing mechanism for a gramophone of the type in which a stack of records to be played are supported at an elevated position above the turntable on a vertically extending spindle and are caused to drop one by one on to the turntable (or previously dropped records thereon), the vertically extending spindle having separate and independent retractable latch means located below the record stack for releasing the lowermost or last record and for supporting the residual stack while the lowermost record is in the process of being dropped. There is described in British Patent No. 794,293 an arrangement of this type in which the lowermost or last record is released by three retractable latches arranged in an inverted tripod form while the residual stack is held during retraction of the latches by means of an expanding collet type device located on the spindle above the latches. The retraction of the latches and the expanding of the collet type device are effected by suitable control mechanism located below the baseplate through rods passing up the spindle.

An object of the present invention is to provide an improved record-changing mechanism of the type indicated in which a record or stack of records can be supported above the turntable on the vertically extending spindle without the use of a steadying arm extending from the baseplate from a point outside the radius of the largest diameter record to be played and in which the stacked record or records, when unsupported by the latches, are not held in place solely by outward pressure applied internally of the record hole(s), e.g. as with the expanding collet type device.

The expanding collet type device may tend to damage or wear the walls of the holes in the records and may be liable to misfunction with a large stack of records unless heavy expansion pressure is applied by the collet-type device, in which case the tendency to damage the record hole is increased.

The invention consists in a record changing mechanism for a gramophone, of the type indicated, wherein the vertically extending spindle is provided above the latch means with a surface inset from the cylindrical surface of the spindle and merging therewith at its lower edge in an inclined step down which a record, not otherwise supported, will slide by gravity, displaceable thrustor means being provided on the spindle level with, and on the opposite side of the spindle to, the inset surface and inclined step, the arrangement being such that the thrustor means is displaced radially of the spindle away from the inset surface at all times when the latches are retracted so as to displace at least the lowermost record of the stack not supported on the latches laterally to be held against the inset surface and on the inclined step by pressure of the thrustor member whereby the record and any records above are supported independently of the latches and that when the latches return to their extended position the thrustor member retracts to allow the lowermost record to slide down over the inclined step on to the latches.

It is well known to provide vertically extending spindles for gramophone record changers, which spindles have a horizontal record supporting step or shoulder and a displaceable thrustor member, but in such devices the lowermost record cannot slide over the step or shoulder by gravity and the thrustor member must be operable so as to push the lowermost record off, and clear of, the step or shoulder. By contrast, according to the present invention the thrustor member serves only to hold the lowermost record on the inclined step when necessary and plays no part, other than a permissive one, in causing the lowermost record to slide off the inclined step by gravity.

The invention further consists in a record changing mechanism for a gramophone, of the type indicated and as set out above, wherein a second inclined step is provided one record thickness above the first-mentioned inclined step, the second inclined step leading into a still further inset surface, the arrangement being such that should the record immediately above the record resting on the first inclined step have a hole slightly smaller than that of the lower record, the thrustor member can still act on the lower record to press it against the first inset surface and hold it on the first inclined step.

The invention still further consists in a record changing mechanism for a gramophone according to the preceding paragraphs wherein the or each inset surface is part of the surface of a cylinder of a radius greater than that of the record hole so as to engage the latter at two spaced points under the influence of the thrustor member which provides a third point of contact whereby tilting of the record(s) is prevented. While the thrustor member may be in the form of a narrow lamina, it is preferred that its record-contacting edge is formed by a cylindrical surface of a radius less than that of a record hole to provide single point contact therewith.

The invention still further consists in a record changing mechanism for a gramophone according to the preceding paragraphs wherein the inter-related operation of the retractable latches and the thrustor member are effected by separate coupling means extending axially of the spindle and actuated by common means displaceable initially horizontally in one direction to operate the thrustor member and then vertically downward to operate, and effect the retraction of, the latches to cause a record to be released from the stack on to the turntable and then vertically upward to re-extend the latches and finally horizontally in the opposite direction to cause the thrustor member to retract and allow the stack of records to rest on the extended latches.

According to a preferred form of the invention, the sequential horizontal and vertical movements of the displaceable common actuator means are effected by rotating cam means driven from rotation of the turntable.

The invention still further consists in a record changing mechanism according to the preceding paragraph, wherein the rotary cam means has a radially extending lift surface for effecting horizontal movements of the displaceable common actuator means and two circumferentially extending cam tracks only one of which has an axial camming component, access by the common actuator means to the cam track having the axial camming component being preventable by a spring-loaded gate which however is normally depressed (and therefore inoperative) when a stacked record still remains to be played by reaction pressure on the displaceable actuator means which therefore moves horizontally and vertically, but which becomes raised and operative when no stacked records are on the spindle to cause the cam track not having the axial component to operate on the displaceable actuator means so that the latter only moves horizontally.

According to a preferred form of the invention, the horizontal only movement of the displaceable actuator means, which takes place when no stacked records are on the spindle and when the cam track not having the axial component is operative, is used to actuate final stop mechanism for the gramophone by contact between means on the displaceable actuator means and the stop mechanism, which means normally pass one another out of contact while any record remains to be played, due to the vertical downward component of movement of the displaceable actuator means taking the contact means thereon out of the path of the stop mechanism.

According to a further feature of the invention, part of the spindle below the baseplate extends through a slot in the displaceable actuator means which slot terminates in an enlarged portion, the arrangement being such that the spindle can only be removed when the enlarged portion of the slot is co-axial with the spindle on movement of the displaceable actuator means to the extreme of its horizontal position at the end of a cycle.

In a further preferred form of the invention, the thrustor member is caused to project and displace a record onto the lower inclined step by means of a wedging cam means movable axially within the spindle against the thrustor member, the cam means being carried on an axially movable rod within the spindle and extending to below the baseboard and to the end of the spindle whereat an abutment means on the rod is engaged by a pivotal link associated with the displaceable actuator means such that on the initial horizontal movement of the displaceable actuator means the link pivots and displaces the abutment on the cam rod to cause the wedge cam to project the thrustor member.

Further according to the invention as set out in the preceding paragraph, the pivotal link is coupled to the displaceable actuator means by spring means through which the horizontal movement of the displaceable actuator means is communicated to the pivotal link pivot so that the outward pressure of the thrustor member on the inside of each stacked record hole is limited to the loading of the spring coupling means.

In the accompanying drawings.

The plan view of the cam means in FIGURE 4 corresponds to the position shown in FIGURE 7.

In carrying the invention into effect according to one mode by way of example, the centre spindle 1 for a record-changing gramophone has a small angled step 2 within its periphery which provides a support for a stack of records spaced above the level of the turntable 3, when a thrustor member 4, preferably made of a suitable plastic, is moved outwardly by axially displaceable cam means 5. The thrustor member 4 may be in the form of a thin lamina throughout or may have its contact surface 6 developed as part of the surface of a cylinder. By this arrangement a record 7 will be held against the inset face 8 on the spindle 1 due to the outward pressure of the thrustor member 4 which presses against the inside of the hole of the record. A secondary step 9 is located one thickness of a record above the step 2 in case the next record on the stack has a tighter or slightly smaller sized hole than the record 7 beneath. The secondary angled step 9 thus allows such a smaller-holed record to move laterally on the spindle 1 under the action of the thrustor member 4 and so ensure that the pressure of the thrustor member 4 is also effectively exerted in the hole of the record 7 therebelow. The radius of curvature of the inset face 8 above the step 2 on the spindle 1 is slightly greater than the radius of a record hole, so that the inset face 8 only touches each record hole at two spaced points. The thrustor member 4 constitutes a third point of contact so that, by virtue of this three point grip, the stacked records or any stacked record is prevented from tilting during the dropping cycle. Where the thrustor member 4 is laminar virtual point contact is achieved, but where the contact surface 6 of the thrustor member 4 is cylindrical, point contact is achieved by making the radius of curvature thereof less than that of the record hole. The thrustor member 4 moves outwardly, and also slightly downwards due to a co-operating inclined face 10 on the spindle 1, under the action of the cam 5 when a cam operating rod 11 is pulled downwards by an operating mechanism (described hereafter) operating on the rod 11 at an abutment 12 at the lower end thereof. A return spring 13 is provided for the rod 11 to return the cam 5 to its original position and at the same time move the thrustor member 4 upwards and by means of a second angled face 10a on the spindle 1 to withdraw it into the spindle 1.

The spindle 1 includes a tubular section 14 which is slotted to take three identical latches 15 which are pivoted at 16. The latches 15 are as described in British Patent No. 794,293 and serve to support the lowermost record 17 of the stack of records while the latches 15 are extended from the spindle 1 as an inverted tripod, the lowermost record 17 receiving no support from the step 2 on the spindle 1. When the latches 15 are retracted (as described hereinafter and in the above mentioned British Patent), the lowermost record 17 falls down on to the turntable 3 while the record 7 immediately above is retained on the step 2 due to the lateral pressure of the projected thrustor member 4. A tubular member 18 which telescopically engages in the lower end of the tublar section 14 of the spindle 1 is slidably mounted in a tubular socket 19, which is fixed in the turntable mounting structure 20 and on which the turntable 3 rotates, so providing a fixed support for the record spindle as a whole. The pivots 16 of the three latches 15 are carried by the upper end of the tubular member 18.

When the complete spindle 1 (including the tubular member 18) is mounted into the tubular socket 19, the end 21 of the tubular section 14 abuts against the end 22 of the tubular socket 19, thus providing a vertical support for the spindle. However, the tubular member 18 is slidably mounted at 23 inside the tubular section 14 of the spindle 1 and the length of axial movement thereof is controlled by a pin 24 which is fixed through tubular section 14 and extends through a gap 25 in the side of the tubular member 18. Thus, it will be seen that when the record spindle 1 is placed in position in the tubular socket 19 and the faces 21 and 22 are in contact, the tubular member 18 can slide axially inside the tubular section 14 of spindle 1 within the limits imposed by the pin 24 engaging in the slot 25. This vertical movement of the tubular member 18 controls the inward and outward movement of latches 15 by movement of the latch pivots 16, as described in the above mentioned British Patent and is controlled by displaceable actuator means including a member 26 which engages a slot 28 formed at the lower end of the tubular member 18, the tubular socket 19 being cut away as at 29 to provide access to the slot 28. Subsequent downward movement of the displaceable member 26 (as will be described) will pull the tubular member 18 downwardly by engagement with the slot 28, thus withdrawing the latches 15 into the spindle 1 to permit the lowermost record 17 to fall as already mentioned.

The outward movement of the thrustor member 4 is controlled by the downward movement of the cam 5 which is mounted on the rod 11 and is moved downwardly by a pivotal link (also below baseboard level) when the displaceable member 26 moves laterally (as will be described) in the direction of the arrow 31 (FIGURE 2), the end of the pivotal link 30 engaging the abutment 12 at the end of the rod 11. The abutment 12 is laterally supported by a face 32 at the lower end of the tubular socket 19 when under lateral pressure from the pivotal link 30.

Figure 2:
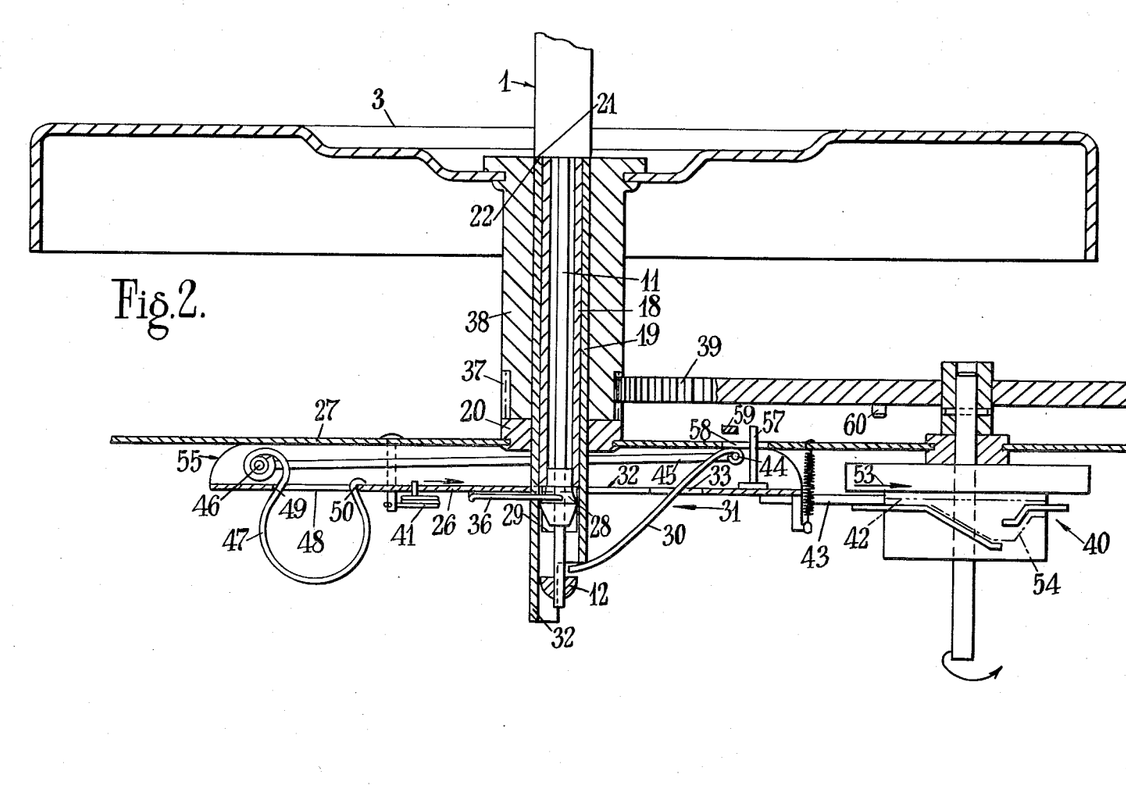
FIGURE 2 is a sectional side elevation on a reduced scale of the lower end of the spindle shown in FIGURE 1 and the operating means therefor.
Figure 3:
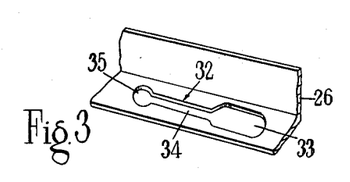
FIGURE 3 is a detailed perspective fragmentary view of part of the operating means shown in FIGURE 2.

The displaceable member 26 is formed with a complex slot 32 (see FIGURE 3), comprising a slot portion 33, through which the pivotal link 30 freely passes, a slot portion 34 which engages in the slot 28 at the base of the tubular member 18 as described hereafter and a slot aperture 35 which permits withdrawal of the spindle assembly axially when the displaceable member 26 is moved fully to the right as viewed in FIGURE 2, the spindle 1 being then only resiliently held in place by a locating spring detent 36. In order that the displaceable member 26 can act on the tubular member 18 by co-action of the slot 28 therein with the slot 32 of the displaceable member 26, the wall of the tubular socket 19 is formed with the above mentioned cut away portions 29 to accommodate the portions of the displaceable member 26 defining the slot 32.

The complete assembly of the spindle 1 including the thrustor member 4 and the pivotal latches 15 when inserted into the tubular socket 19 has its operations controlled (a) as regards the thrustor member 4 by down ward movement of the rod 11 and abutment 12 caused by pivoting of the pivotal link 30 on the lateral part of the movement of the displaceable member 26, as will be described, and (b) as regards the latches 15 by downward movement of the displaceable member 26 acting in the tubular member 18 through the slot 28.

Figure 4:
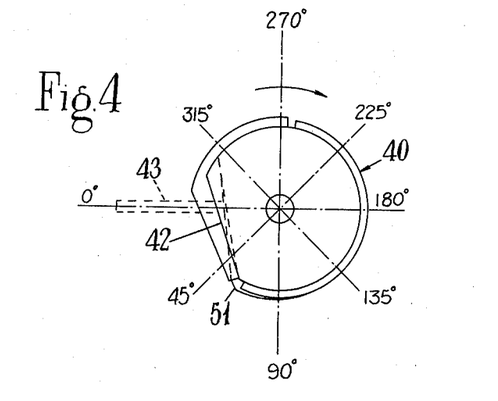
FIGURE 4 is a plan view of the rotary cam means shown in FIGURE 2.
Figure 5:
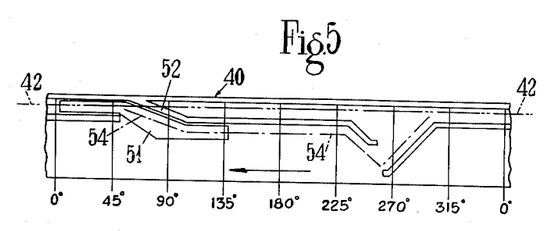
FIGURE 5 is a development of the surface of the cam means shown in FIGURE 4.

It is necessary to understand the function and movement of the displaceable member 26 to follow the behavior of the spindle and also of the final switch off mechanism, which comes into operation after the last record of the stack has been played. A pinion 37 suitably secured on the turntable boss 38 engages with a gear 39 for the purposes of rotating a sequence control cam 40. Rotation of the cam 40 moves the displaceable member 26 laterally in the direction of the arrow 31 at the beginning of the cycle and an anchored coil spring 41 returns it to its normal position at the end of the cycle. This movement of the displaceable member 26 is achieved by a cam profile 42 on the cam 40 acting on a cam-follower pin 43 fixed as an extension to the displaceable member 26; the contour of the cam profile 42 is shown in FIGURES 4 and 5. The cam-follower pin 43 is lightly held in working contact with the cam 40 by the coil spring 41. During this movement the slot portion 33 in the displaceable member 26 engages with the slot 28 at the base of the tubular member 18 ready for vertical displacement of the latter when the displaceable member 26 is depressed, as will be described. The pivotal link 30 is pivoted at 44 on the end of a link bar 45 which in turn is pivoted at its other end at 46 on a spring 47 mounted in a slot 48 in the displaceable member 26 and which exerts pressure against the end 49 of the slot 48. The other end of the spring 47 presses against the opposite end 50 of the slot 48 so that when the displaceable member 26 moves laterally in the direction of arrow 31, the link bar 45 also moves in the same direction coupled thereto by the spring 47 through its pivot 46. As a result the end of the pivotal link 30 will move downwardly to engage with and depress the abutment 12 on the rod 11.

A spring-loaded ramp gate 51 (see FIGURES 4 and 5) is provided on the cam 40 which allows the cam-follower pin 43 to move in the track of the cam profile 42 continuously and without deviation by riding over an inclined cam face 52, if no pressure other than that of the coil spring 41 is exerted by the cam-follower pin 43 against the surface of the cam profile 42 in the direction of arrow 53. This is the condition when no records are stacked on the spindle, and causes actuation of the final stop mechanism as will be described. If, however, excess pressure is developed as will be described and is exerted in the direction of arrow 53 by the cam-follower pin 43, the spring-loaded ramp gate 51 will be depressed and the pin 43 will engage the inclined cam face 52 and will be guided into a secondary cam profile 54 causing a downward movement of the end of the cam-follower pin 43 and hence a downward pivoting movement of the displaceable member 26 about a bearing face 55 thereon remote from the cam 40. This downward movement of the displaceable member 26 will result in downward movement of the tubular member 18 through engagement of the displaceable member 26 in the slot 28 at the bottom of the tubular member 18, to retract the latches 15 as part of the record changing cycle. This is the condition which is cyclically repeated while any records remain stacked on the spindle 1 as will be further explained hereafter in connection with the operation of the final stop mechanism.

Thus, while there are records stacked on the spindle 1, the initially lateral movement of the displaceable member 26 in the direction of the arrow 31 causes the pivotal link 30 to pivot and cause the thrustor member 4 to project and grip the stacked records and the subsequent downward movement of the displaceable member 26 pulls down the tubular member 18 to retract the latches 15 to permit the lowermost record to drop.

It is most important to realise that the thrustor member 4 which expands inside the hole in a record as already described, is positively moved by the downward movement of the cam means 5 on the rod 11. It has been the normal practice to place spring means inside the spindle to change this positive action into a spring-loaded one, but the space available inside the spindle is very limited. According to a preferred embodiment of the present invention, spring-loaded means has been provided externally of the spindle to ensure that the action of the rotary cam 40 is not transmitted positively to the thrustor member 4. To this end when the displaceable member 26 is in its fully maximum outward position from the axis of the cam 40 as far as the operation of the pivotal link 30 against the abutment 12 is concerned, any further movement of the member 26 in the same direction due to the cam 40, can be taken up as far as the pivotal link 30 is concerned by flexure of the spring 47 so that the pivot 46 of the link bar 45 remains stationary while the displaceable member 26 may continue to move in the direction of arrow 31. Thus the spring 47 instead of being supported against the end 49 of the slot 48 will be pressing against the pivot 46 of the link bar 45 in the same direction as arrow 31. This spring pressure will be transmitted through the link bar 45 and the pivotal link 30 to press downwardly on the abutment 12 of the rod 11 and eventually act through the cam means 5 on the face of the thrustor member 4, so that the pressure of the spring 47 will be applied to the inside of the hole of the record(s). The application of this spring pressure inside the record is very important to prevent damage to the record, but also it is the means by which the final stop mechanism can be operated, as will now be described.

Figure 1:
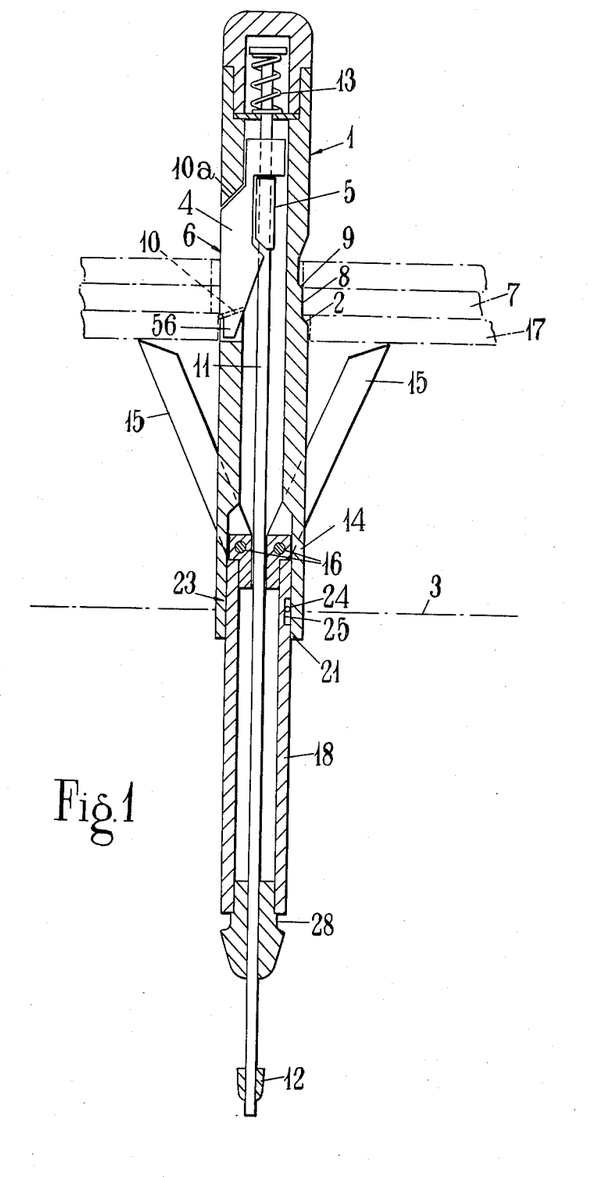
FIGURE 1 is a rectilinear side elevation on an enlarged scale of one form of spindle according to the present invention.

From the foregoing, it will be seen :

(a) That if there are any records stacked on the spindle 1, the effect of the thrustor member 4 being pressed against the inside of the hole of the record(s) is to cause a resulting (reaction) thrust on the end of the cam follower pin 43 against the surface of the cam profile 42, in addition to the thrust created by the spring 41, the thrust being sufficient to depress the spring-loaded gate 51 situated in the bottom of the groove of the cam profile 42 and cause the cam-follower pin 43 to be diverted from the cam profile 42 and to travel along the secondary cam profile 54 with the result that the displaceable member 26 is moved downwardly as described. Since, however, the last record to be played rests solely on the projecting latches 15 and is below the level of the inclined shoulder 2, the thrustor member 4 has a downward tongue 56 (FIGURE 1) which projects inside the hole of the last record to enable the thrustor member 4 to transmit resultant pressure back to the cam-follower pin 43 and cam gate 51 (as described above) and so prevent the final stop mechanism being actuated (as will be described) until after the last record has been dropped and the next cycle started. Thus, it will be seen that the element 45 together with the pivoted link 30 and the spring 47 form a spring transmission means which responds automatically to engagement by the thrust means 4 with a record for providing additional force through the cam follower 43 onto the spring-loaded gate 51 for depressing the latter to provide automatic downward movement of the displaceable common actuating means 26 as long as a record is present to be engaged by the thrustor means 4.

(b) If there are no records stacked on the spindle, the thrustor member 4 is free to project without restriction and consequently there is no resulting (reaction) thrust transmitted to the cam-follower pin 43 against the spring-loaded gate 51 in the cam profile 42 at the start of the next cycle. Therefore, the cam-follower pin 43 will continue to follow the cam profile 42 and consequently the displaceable member 26 will not be moved downwards.

Figure 6:
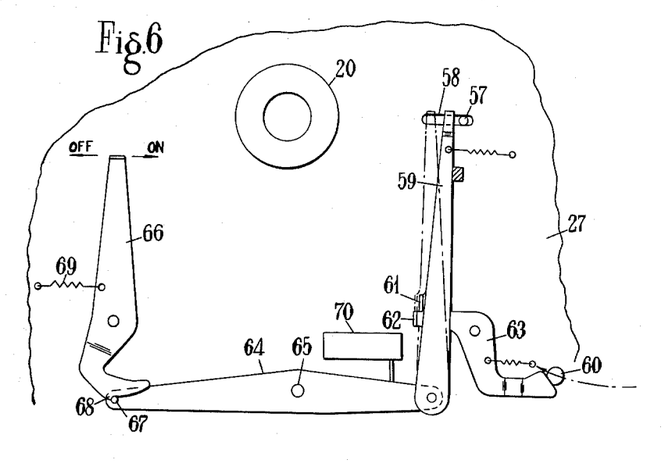
FIGURE 6 is a plan view of a final stop mechanism for the means shown in FIGURE 2, FIGURES 7, 8, 10 and 12 are side views of the spindle and part of the operating means therefor during various stages of operation.
Figure 7:
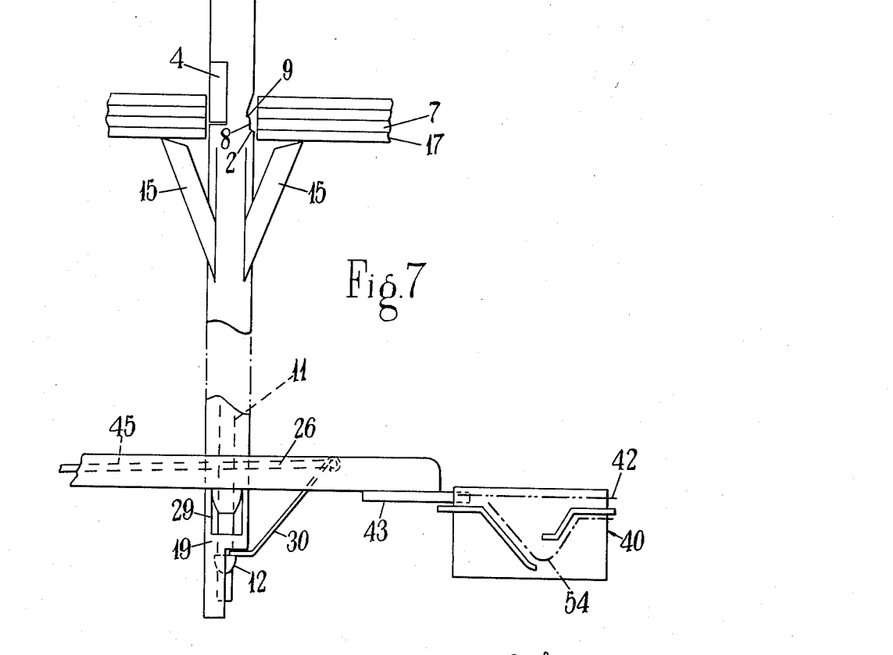
Figure 8:
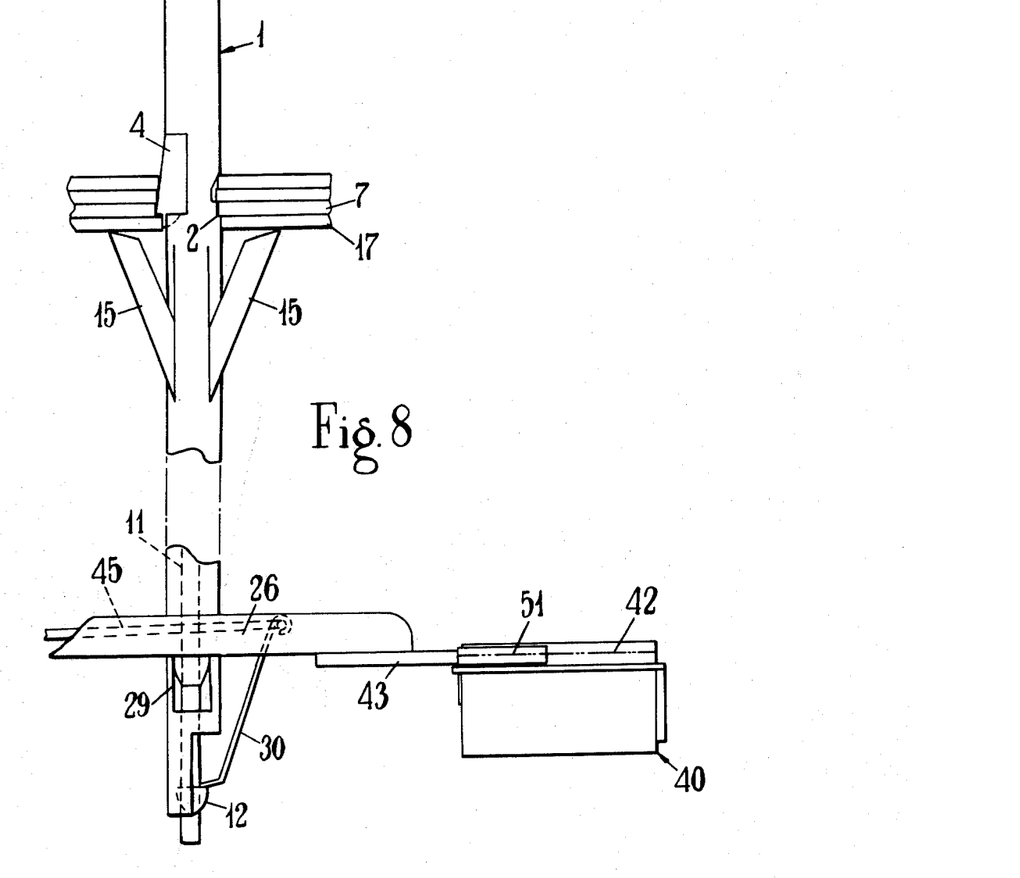
Figure 9:
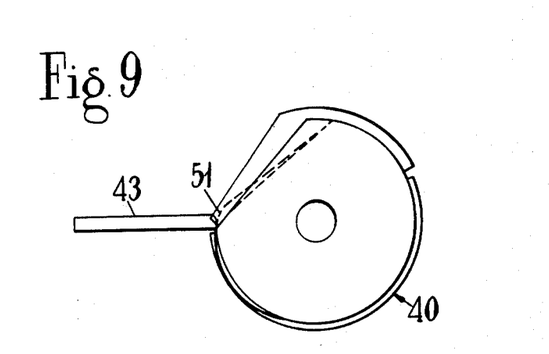
FIGURES 9, 11 and 13 are plan views of the operating cam means in position corresponding to FIGURES 8, 10 and 12 respectively.
Figure 10:
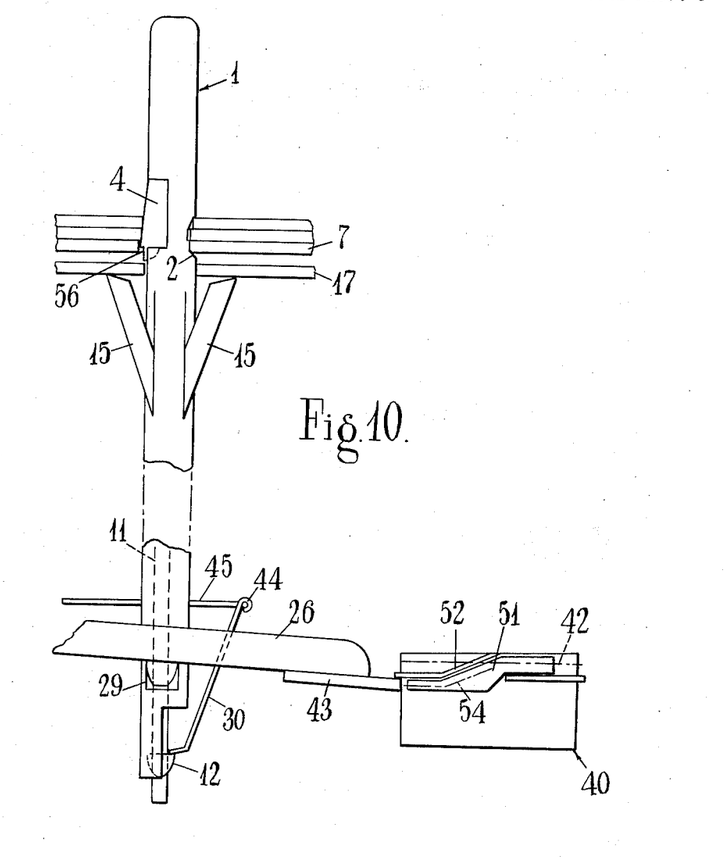
Figure 11:
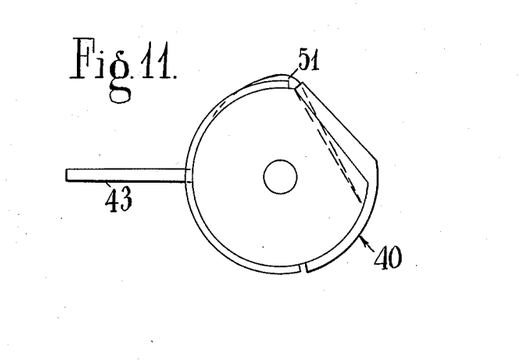
Figure 12:
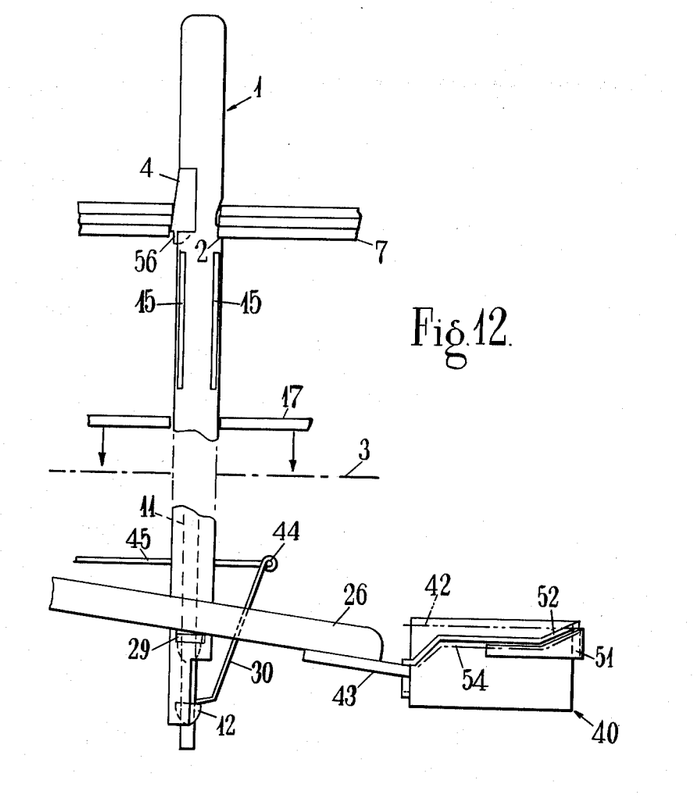
Figure 13:
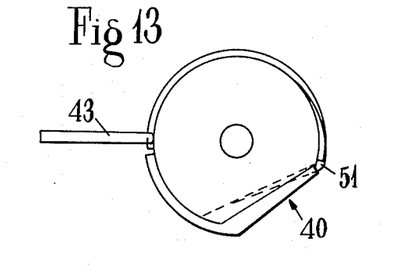

To utilize these differential movements of the displaceable member 26 to actuate the final stop mechanism only when no records are stacked on the spindle, an upstanding post 57 is fixed to the displaceable member 26 so as to travel downwards if the displaceable member 26 is depressed when the cam-follower pin 43 follows the cam profile 54, but the post 57 will move only horizontally with the displaceable member 26 if the pin 43 follows cam profile 42. The post 57 has, therefore, two paths, (i) horizontal followed by downwards movement (normal cycling) and (ii) horizontal only when no record remains on the stack and its latter movement can be utilised to provide operation of the final stopping mechanism. This can be achieved, for example, by the post 57 being extended up through a slot 58 in the baseplate 27 so that when the cam following pin 43 is following the cam profile 42, moving a final stop actuating member 59 into a position to be influenced by the movement of a projection 60 on the underside of the gear wheel 39 such that the projection 60 causes movement of the stop-actuating member 59 to switch off the drive. Thus, see FIGURE 6, on movement of the post 57 in the direction of the arrow 31, the stop-actuating member 59 pivots to the dotted positon and brings a projection 61 thereon into the path of a projection 62 on a pivotal member 63 with which the projection 60 on the gear wheel 39 makes contact on each revolution. The pivot member 63 is thus rocked and this movement is transmitted through the projection 61 and 62 to the stop-actuating member 59 which causes a lever 64 to which the member 59 is pivoted to rock about its fixed pivot 65 and in turn release a spring loaded on-off lever 66 by moving a pin 67 on the lever 64 away from a detent 68 on the lever 66 so that the lever 66 pivots to the off position through the action of a spring 69 and the switch 70 is opened by the movement of the lever 64.

Conversely, if the cam-following pin 43 follows the cam profile 54, i.e. when record(s) are still present in the stack on the spindle 1, the post 57 will be lowered (as it is fixed to the displaceable member 26 so as to pass under the final stop-actuating member 59 which is not therefore moved and the projection 61 thereon stays out of the path of the projection 62 on the pivotal member 63 and the mechanism will not switch off.

We claim:
1. A record changing mechanism for a gramophone, comprising a vertically extending hollow spindle formed with a plurality of circumferentially distributed openings having end camming surfaces, respectively, a plurality of elongated latches respectively extending through said openings to be cammed by said camming surfaces thereof to outer positions extending beyond the exterior surface of said spindle during upward movement of said latches and inwardly at least to the exterior surface of said spindle during downward movement of said latches, said spindle having above said latches a surface inset from the exterior surface of the spindle and merging therewith at its lower edge in an inclined step down which a record, not otherwise supported, will slide by gravity, displaceable thrustor means being provided on the spindle level with, and on the opposite side of the spindle to, the inset surface and inclined step, and displacing means for displacing said thrustor means radially of the spindle away from the inset surface and retracting said latches downwardly so as to displace at least the lowermost record of the stack not supported on the latches laterally to be held against the inset surface and on the inclined step by pressure of said thrustor means whereby the record and any records above are supported independently of the latches, said displacing means then moving said latches upwardly to their positions extending outwardly of said spindle and retracting said thrustor means to allow the lowermost record to slide down over the inclined step on to the latches.

2. A record changing mechanism for a gramophone, as claimed in claim 1, wherein a second inclined step is provided one record thickness above the first mentioned inclined step, the second inclined step leading into a still further inset surface, the arrangements being such that should the record immediately above the record resting on the first inclined step have a hole slightly smaller than that of the lower record, the thrustor means can still act on the lower record to press it against the first inset surface and hold it on the first inclined step.

3. A record changing mechanism for a gramophone as claimed in claim 1, wherein said inset surface is part of the surface of a cylinder of a radius greater than that of the record hole so as to engage the latter at two spaced points under the influence of the thrustor means which provides a third point of contact whereby tilting of the record is prevented.

4. A record changing gramophone as claimed in claim 3, wherein the thrustor means is in the form of a narrow lamina, having a record-contacting edge formed by a cylindrical surface of a radius less than that of a record hole to provide single point contact therewith.

5. A record changing mechanism for a gramophone as claimed in claim 1, wherein said displacing means providing the interrelated operation of the retractable latches and the thrustor means include coupling means extending axially of the spindle and common actuator means actuating said coupling means and displaceable initially horizontally in one direction to operate the thrustor means and then vertically downward to operate, and effect the retraction of, the latches to cause a record to be released from the stack on to the turntable and then vertically upward to re-extend the latches and finally horizontally in the opposite direction to cause the thrustor means to retract and allow the stack of records to rest on the extended latches.

6. A record changing mechanism for a gramophone as claimed in claim 5, wherein a rotary cam means driven from rotation of a turntable effects the sequential horizontal and vertical movements of the displaceable common actuator means.

7. A record changing mechanism for a gramophone as claimed in claim 6, wherein the rotary cam means has a radially extending lift surface for effecting horizontal movements of the displaceable common actuator means and two circumferentially extending cam tracks only one of which has an axial camming component, a spring loaded gate preventing access by the common actuator means to the cam track having the axial camming component, said spring loaded gate however being normally depressed (and therefore inoperative) when a stacked record still remains to be played by reaction pressure on the displaceable actuator means which therefore moves horizontally and vertically but which becomes raised and operative when no stacked records are on the spindle to cause the cam track not having the axial component to operate on the displaceable actuator means so that the latter only moves horizontally.

8. A record changing mechanism for a gramophone as claimed in claim 7, wherein a final stop means is actuated by the horizontal-only movement of the displaceable actuator means, which takes place when no stacked records are on the spindle and when the cam track not having the axial component is operative, by contact between the displaceable actuator means and stop means, said displaceable actuator and stop means normally passing one another without contact while any record remains to be played, due to the vertical downward component of movement of the displaceable actuator means taking the latter out of the path of the stop means.

9. A record changing mechanism for a gramophone as claimed in claim 5, wherein said displaceable actuator means is formed with a slot and part of the spindle below a baseplate extends through said slot in the displaceable actuator means which slot terminates in an enlarged portion, the spindle be removable only when the enlarged portion of the slot is co-axial with the spindle on movement of the displaceable actuator means to the extreme of its horizontal position at the end of a cycle.

10. A record changing mechanism for a gramophone as claimed in claim 5, wherein said displaceable actuator means, for causing the thrustor means to project and displace a record onto the lower inclined step, includes a wedging cam means movable axially within the spindle against the thrustor means, an axially movable rod within the spindle carrying said wedging cam means and extending to below a baseboard and to the end of the spindle whereat said rod carries an abutment means, said displaceable common actuator means including a pivotal link engaging said abutment means on the initial horizontal movement of the displaceable actuator means to pivot said link and displace the abutment means on the cam rod to cause the wedging cam means to project the thrustor means.

11. A record changing mechanism for a gramophone as claimed in claim 10, wherein a spring means couples said pivotal link to the displaceable actuator means and communicates the horizontal movement of the displaceable actuator means to the pivotal link pivot so that the outward pressure of the thrustor means on the inside of each stacked record hole is limited to the loading of the spring coupling means.

12. In a record changing mechanism for a gramophone, a hollow spindle adapted to extend through a stack of records located above a turntable of the gramophone, thrustor means mounted within said hollow spindle for movement outwardly thereof to a position pressing against the record above the lowest record of the stack to prevent the record above the lowest record of the stack and all of the records thereabove from dropping onto the turntable, a cam follower, rotary cam means engaging said cam follower and providing the latter with one cam path producing only horizontal movement of said cam follower and a second cam path producing horizontal and vertical movement of said cam follower, said rotary cam means including a spring loaded gate which normally provides said one cam path but which when pressed with a sufficient force by said cam follower provides said second cam path to said cam follower, displaceable actuator means fixed to said cam follower to be moved horizontally when said cam means applies said one cam path to said cam follower and to be moved both horizontally and vertically when said cam means provides said second cam path to said cam follower, spring transmission means carried by said displaceable actuator means and responding automatically to engagement of a record by said thrustor means for applying to said cam follower a spring force sufficient to press against said spring loaded gate to displace the latter to a position exposing said cam follower to said second cam path, so that as long as a record is engaged by said thrustor means said displaceable actuator means will be moved horizontally and vertically when there is no record to be engaged by said thrustor means said displaceable actuator means will be moved only horizontally, and means responding to vertical movement of said displaceable actuator means for dropping the lowermost record of the stack onto the turntable.

13. In a mechanism as recited in claim 12, final stop means for stopping the gramophone, said final stop means responding automatically to horizontal movement of said displaceable actuator means provided by exposure of said cam follower to said one cam path for stopping the operation of the gramophone.

References Cited by the Examiner

UNITED STATES PATENTS 2,287,098   6/42   Habegger _______________ 274—10
3,046,021   7/62   Perge _________________ 274—10

NORTON ANSHER, *Primary Examiner.*

EMIL G. ANDERSON, *Examiner.*